May 2, 1967  J. ZEMAN  3,317,767
COMPENSATED TACHOMETER
Filed Feb. 12, 1963  2 Sheets-Sheet 1
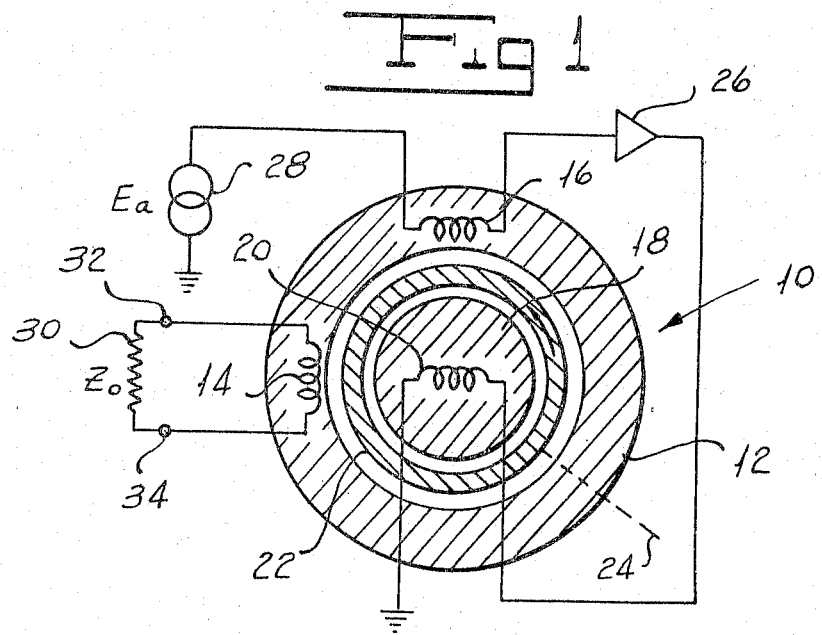
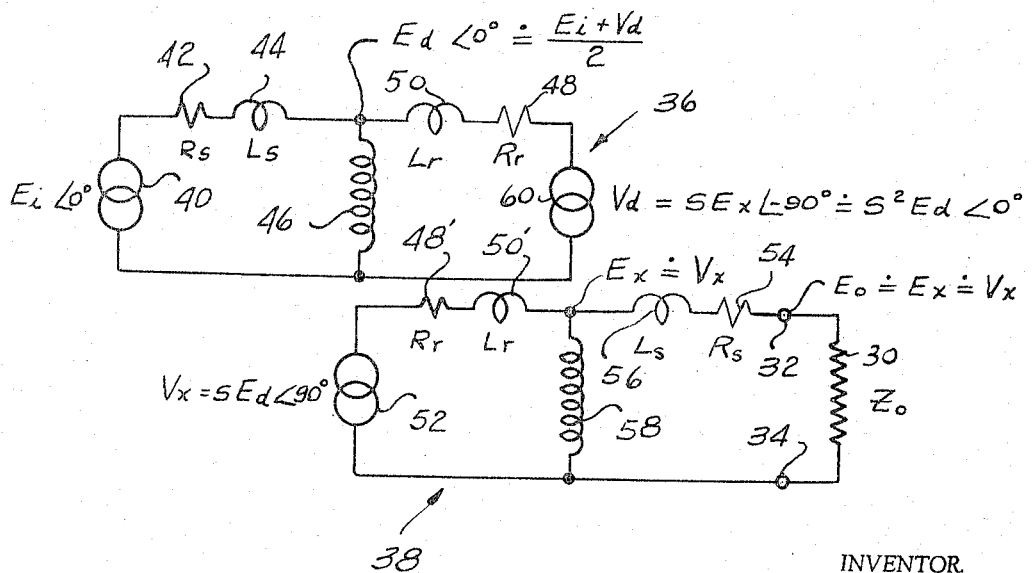
INVENTOR.
JOSEPH ZEMAN
BY
Shenier & O'Connor
ATTORNEYS United States Patent Office 3,317,767
Patented May 2, 1967

3,317,767
COMPENSATED TACHOMETER
Joseph Zeman, Bay Shore, N.Y., assignor to United Aircraft Corporation, East Hartford, Conn., a corporation of Delaware
Filed Feb. 12, 1963, Ser. No. 257,924
9 Claims. (Cl. 310—166)

My invention relates to a precision tachometer and more particularly to an improved tachometer, the output signal of which is substantially proportional to the speed of the rotating element.

There are known in the prior art many forms of tachometer. One electrical tachometer of the prior art includes a rotor which moves in the air gap of a stator carrying an input winding on one side of the air gap and an output winding on the other side of the air gap. With the input winding energized as the rotor moves through the flux passing through the air gap there is induced therein a voltage which is a function of speed. This induced voltage produces its own magnetic field which links the output winding to generate a voltage therein which is a function of speed. One difficulty which has been experienced with tachometers of this type is the nonlinearity of the change in the output voltage of the device with changes in speed. Various attempts have been made in the prior art to compensate for this nonlinearity in the change in output voltage with changes in speed. These attempts either have not been successful or have involved such complicated mechanism as to be entirely impractical.

Also, in the prior art separate temperature sensitive elements have been employed to compensate for the effect of changes in temperature on the windings.

I have invented a precision tachometer which overcomes the defects of tachometers of the prior art. My tachometer produces an output signal which is very nearly proportional to the speed of rotation of the rotating element. The rate of change of output voltage with changes in speed is substantially constant. My device is extremely simple for the result achieved. It does not require separate elements to compensate for the effect of changes in temperature.

One object of my invention is to provide a precision tachometer for producing an output which is substantially proportional to the speed of the rotating element.

Another object of my invention is to provide a precision tachometer having a rate of change of output voltage with speed which is substantially constant.

A further object of my invention is to provide a precision tachometer which is extremely simple in construction for the result achieved thereby.

Yet another object of my invention is to provide a precision tachometer which does not require separate elements to compensate for the effect of changes in temperature.

Other and further objects of my invention will appear from the following description.

In general my invention contemplates the provision of a precision tachometer in which I connect a feedback winding and a feedback amplifier in series between the voltage source and the input winding to maintain the air gap flux substantially constant whereby the output voltage is proportional to the speed of the rotor shaft.

In the accompanying drawings which form part of the instant specification and which are to be read in conjunction therewith and in which like reference numerals are used to indicate like parts in the various views:

FIGURE 1 is a sectional view of my precision tachometer with parts shown schematically.

FIGURE 2 is an equivalent circuit of my tachometer with its feedback winding omitted.

Figures 3, 4:
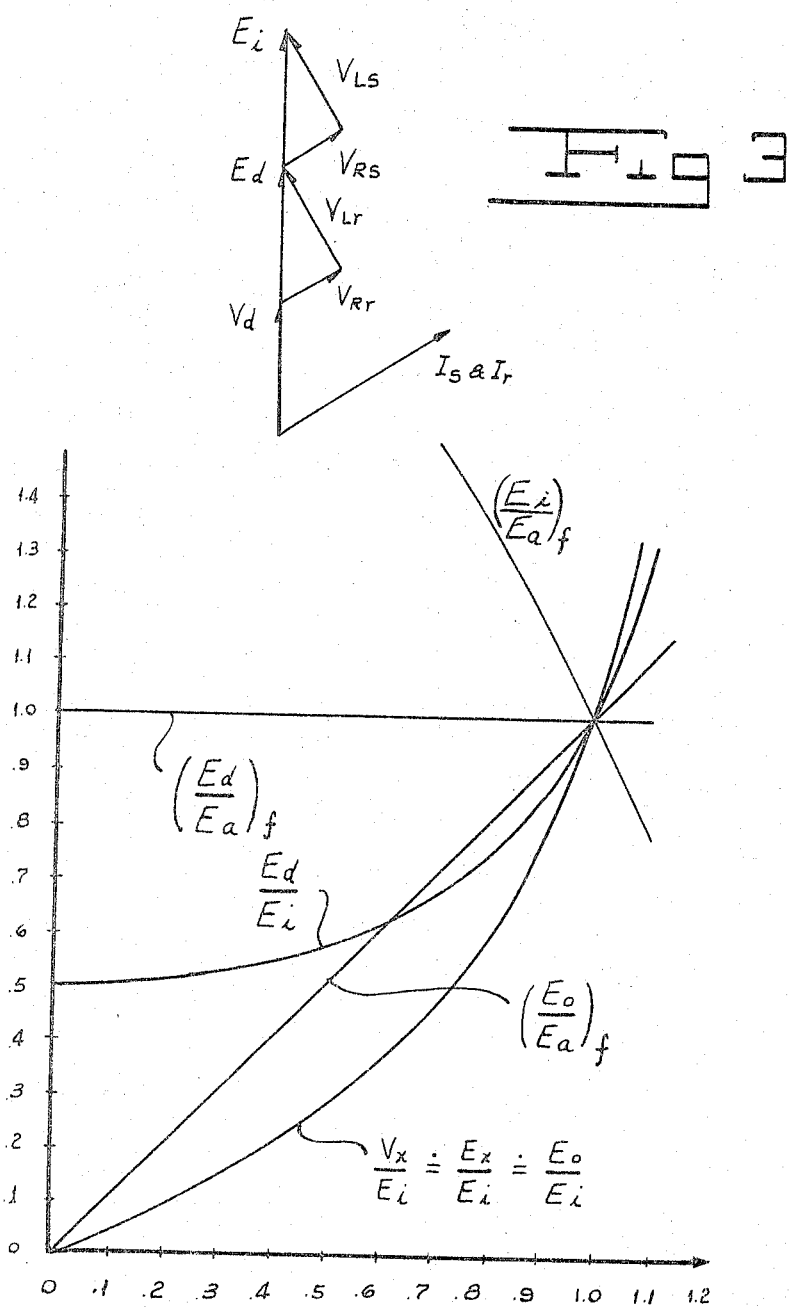
FIGURE 3 is a vector diagram illustrating the relationship of various voltages of the circuit of FIGURE 2 for one condition of operation of the tachometer.
FIGURE 4 is a plot of the ratios of various voltages for different speeds.

Referring now to FIGURE 1, my precision tachometer indicated generally by the reference character 10 comprises an outer stator portion 12 which carries the output winding 14 and a feedback winding 16. The inner stator portion 18 carries the tachometer input winding 20. A conductive cup or rotor 22 mounted for rotation in the air gap between the stator parts 12 and 18 is adapted to be driven by a shaft 24. I connect the feedback winding 16 and a feedback amplifier 26 in series between a source 28 of input voltage $E_a$ and the input winding 20. Output winding 14 has a load impedance 30 with a value $Z_o$ connected across to output terminals 32 and 34. It will be appreciated that when winding 20 is energized it produces a magnetic field along an axis I have termed the "direct" axis of the device. For the purposes of the explanation given hereinbelow, I have termed the axis at right angles to the direct axis as the "cross" axis of the device.

Referring now to FIGURE 2 the equivalent circuit of the tachometer 10, ignoring the feedback winding 16, includes a direct axis component indicated generally by the reference character 36 and a cross axis component indicated generally by the reference character 38. The input voltage on winding 20 is represented by a source 40 of voltage $E_1$. I have represented the resistance 42 and the leakage inductance 44 of the winding 20 as having values $R_s$ and $L_s$. The mutual inductance between the winding 20 and the rotor 22 is indicated by the inductor 46. I have represented the direct axis resistance 48 and direct axis leakage inductance 50 of the rotor 22 as having values $R_r$ and $L_r$ in FIGURE 2. It will readily be appreciated that with winding 20 energized from the source of voltage $E_a$ there will be induced in the rotor 22 a voltage which I have shown as the voltage $E_d$ in FIGURE 2.

When rotor 22 is driven, there is generated therein a cross axis voltage $V_x$ which is determined by the rate at which the rotor cuts the mutual flux. Now $E_d$ is a measure of the mutual flux so that the rotor cross axis generated voltage $V_x$ which is a function of speed can be defined as (1) $$V_x = sE_d \angle 90°$$

This voltage is shown in the cross axis portion 38 of the equivalent circuit as the generator 52. In circuit portion 38 I have shown the cross axis rotor resistance 48' and the cross axis leakage inductance 50' as having values $R_r$ and $L_r$ which are equal to the corresponding direct axis quantities. The resistance 54 and leakage inductance 56 of output winding 14 are considered to have respective values $R_s$ and $L_s$ which are the same as the corresponding properties of the input winding 20. I have assumed further that the rotor direct axis and cross axis resistance and leakage inductance are equal to each other and are equal to the input and output winding resistance and leakage inductance and that a one-to-one turns ratio exists between all windings. The mutual inductance between the rotor 22 and the output winding 14 for the cross axis circuit 38 is indicated by the inductor 58. I have made these assumptions for simplicity in analysis of the circuit.

It will readily be appreciated that in my tachometer the impedance $Z_o$ connected across output terminals 32 and 34 is very high with the result that no appreciable load is placed on the winding 14. Owing to the fact that the output winding draws no appreciable load current the cross axis induced voltage $E_x$ in the output winding is substantially equal to the cross axis generated voltage $V_x$ in the rotor, as indicated in FIGURE 2. This cross axis rotor generated voltage $V_x$ induces a voltage $E_x$ in the output winding 14. The output winding voltage $E_x$ produces a cross axis mutual flux. As the rotor 22 cuts this flux a speed voltage $V_d$ is generated in the rotor. This voltage is represented in the direct axis equivalent circuit 36 by generator 60. Since $E_x$ is a measure of the cross axis mutual flux and since $V_d$ is a speed voltage it can be defined as:

(2) $$V_d = sE_x \angle -90°$$

Substituting for $V_x$ in Equation 2 we see that (3) $$V_d = s^2 E_d \angle 0°$$

Around the outside loop of the direct axis equivalent circuit it can readily be seen that (4) $$E_d \angle 0° = \frac{E_i + V_d}{2}$$

Equation 4 may be rewritten as (5) $$\frac{E_d}{E_i} = \frac{1}{2-s^2}$$

Now since $V_x$ is equal to $sE_d$ then (6) $$\frac{V_x}{E_i} = \frac{s}{2-s^2}$$

Now since, as is explained hereinabove, the output winding draws substantially no load current we can write (7) $$\frac{E_o}{E_i} = \frac{s}{2-s^2}$$

From Equations 5 and 7 it will readily be seen that the ratio of the direct axis induced voltage to the input voltage on winding 20, assuming a constant input voltage, is nonlinear since it includes a squared speed term. Similarly, the ratio of the output voltage on winding 14 to the input voltage on winding 20 is nonlinear and includes a squared speed term. I have shown typical plots of these ratios in FIGURE 4. It will readily be apparent that the nonlinearity is introduced by the direct axis generated voltage $V_d$. In my precision tachometer I compensate for the effect of this voltage by means of my feedback winding 16 and its associated amplifier 26. With the feedback winding 16, as shown in FIGURE 1, there is induced therein a feedback voltage resulting from the direct axis generated voltage $V_d$. This feedback voltage so affects the input voltage to winding 20 as to make the mutual flux constant with the result that the voltage $E_d$ is constant and consequently the output voltage $E_o$ is directly proportional to speed. In FIGURE 4 I have shown a plot of the ratio of $E_i/E_a$, where $E_a$ is the input voltage with feedback. It will be apparent that this ratio is a reciprocal of the ratio $E_d/E_i$. Now with feedback the ratio of the output voltage $E_o$ to input voltage $E_a$ is linear indicating that the output voltage is directly proportional to speed. Similarly with feedback the ratio of the direct axis induced voltage $E_d$ to the input voltage $E_a$ is a constant. In the plot of FIGURE 4 this relationship is indicated as unity.

In operation of my precision tachometer when shaft 24 rotates with an input voltage $E_a$ to the circuit including the feedback winding 16, the amplifier 26 and the winding 20, there is induced in the rotor 22 a direct axis voltage $Ed$ which is a consant. This voltage $Ed$ is a measure of the mutual flux which is cut by the rotor 22. As the rotor cuts the flux there is generated therein a cross axis generated voltage $V_x$ which is directly proportional to the speed of the rotor 22. This generated voltage $V_x$ induces a cross axis voltage $E_x$ in the output winding 14. Owing to the fact that substantially no load is placed on the output winding, the output voltage $E_o$ is substantially equal to the cross axis induced voltage $E_x$ which, in turn, is substantially equal to the generated voltage $V_x$.

The induced voltage $E_x$ produces an air gap flux which is cut by the rotor 22 so that there is generated therein a direct axis voltage $V_d$. This generated cross axis voltage induces a feedback voltage to the winding 16 which is amplified by amplifier 26 and applied to the input winding 20 in such a way as to compensate for the nonlinearity introduced by the voltage $V_d$ thus to maintain the air gap flux constant with the result that the output voltage is directly proportional to speed.

It will be seen that I have accomplished the objects of my invention. I have provided a precision tachometer which produces an output signal which is substantially proportional to the speed of the rotor. The rate of change of output voltage with speed is substantially constant. My precision tachometer is extremely simple for the result achieved thereby. It does not require any separate temperature compensation means.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A tachometer including in combination an input winding, an output winding, means mounting said input and output windings in spaced relationship with an air gap therebetween, means for applying an input voltage to said input winding to produce a flux in said air gap, a rotor, means mounting said rotor for rotary movement in said air gap to cut said flux to cause a speed voltage to be generated therein, said speed voltage inducing an output voltage in said output winding, said output voltage producing a counter voltage in said rotor and means for modifying said input voltage to overcome the effect of said counter voltage.

2. A tachometer including in combination a stator formed with an air gap, an input winding, means for energizing said input winding to produce a direct axis flux in said air gap, a rotor, means mounting said rotor for rotary movement in said air gap to cut said flux to cause a cross axis voltage to be generated in said rotor, and output winding, means mounting said output winding on said stator so that a cross axis voltage is induced therein under the action of said cross axis generated voltage, said cross axis induced voltage producing a direct axis generated voltage in said rotor and means for introducing a voltage into said input winding to compensate for the effect of such direct axis generated voltage.

3. A tachometer including in combination an input winding, an output winding, means mounting said input and output windings in spaced relationship wtih an air gap therebetween, an input circuit for applying a voltage to said input winding to produce a flux in said air gap, a rotor, means mounting said rotor in said air gap for rotary movement to cut said flux to cause a speed voltage to be generated therein, said speed voltage inducing an output voltage in said output winding, said output voltage producing a counter voltage in said rotor and means for feeding a voltage which is a function of said counter voltage into said input circuit to compensate for the effect of said counter voltage.

4. A tachometer including in combination and input winding, an output winding, means mounting said input and output windings in spaced relationship with an air gap therebetween, an input circuit for applying a voltage to said input winding to produce a flux in said air gap, a rotor, means mounting said rotor in said air gap for rotary movement to cut said flux to cause a speed voltage to be generated therein, said speed voltage inducing an output voltage in said output winding, said output voltage producing a counter voltage in said rotor, a feedback winding connected in said input circuit and means mounting said feedback winding in a position at which said counter voltage induces a feedback voltage therein to compensate for the effect of said counter voltage.

5. A tachometer including in combination an input winding, an output winding, means mounting said input and output windings in spaced relationship with an air gap therebetween, an input circuit for applying a voltage to said input winding to produce a flux in said air gap, a rotor and means mounting said rotor in said air gap for rotary movement to cut said flux to cause a speed voltage to be generated in said rotor, said speed voltage inducing an output voltage in said output winding, said output voltage producing a counter voltage in said rotor, said input circuit comprising a feedback winding positioned to have a feedback voltage induced therein under the action of said counter voltage and an amplifier for applying said feedback voltage to said input winding.

6. A tachometer including in combination an inner core, an outer core, means mounting said cores in spaced relationship with an air gap therebetween, an input winding, means mounting said input winding on one of said cores, an output winding, means mounting said output winding on the other of said cores, means for applying a voltage to said input winding to produce a flux in said air gap, a rotor and means mounting said rotor in said air gap for rotary movement to cut said flux to produce a speed voltage in said rotor, said speed voltage inducing an output voltage in said output winding, said output voltage producing a counter voltage in said rotor, said voltage applying means comprising a feedback winding carried by said other core.

7. A tachometer including in combination an inner core, an outer core, means mounting said cores in spaced relationship with an air gap therebetween, an input winding, means mounting said input winding on one of said cores, an output winding, means mounting said output winding on the other of said cores, means for applying a voltage to said input winding to produce a flux in said air gap, a rotor and means mounting said rotor in said air gap for rotary movement to cut said flux to produce a speed voltage in said rotor, said speed voltage inducing an output voltage in said output winding, said output voltage producing a counter voltage in said rotor, said voltage applying means comprising a feedback winding carried by said other core to have a feedback voltage produced therein by said counter voltage and an amplifier for applying said feedback voltage to said input winding.

8. A tachometer including in combination an input winding, an output winding, means mounting said input and output windings in spaced relationship with an air gap therebetween, means for applying a voltage to said input winding to produce a flux in said air gap, a rotor and means mounting said rotor for movement in said air gap to cause a speed voltage to be generated therein, said speed voltage inducing an output voltage in said output winding, said output voltage acting to modify said air gap flux, said means for applying voltage to said input winding comprising means responsive to said air gap flux for varying the voltage applied to the input winding to maintain said air gap flux constant.

9. A tachometer including in combination an input winding, an output winding, means mounting said input and output windings in spaced relationship with an air gap therebetween, means for applying a voltage to said input winding to produce a flux in said air gap, a rotor and means mounting said rotor for movement in said air gap to cause a speed voltage to be generated therein, said speed voltage inducing an output voltage in said output winding, said output voltage acting to modify said air gap flux, said means for applying voltage to said input winding comprising a feedback winding linked by said air gap flux for varying the voltage applied to the input winding to maintain said air gap flux constant.

References Cited by the Examiner

UNITED STATES PATENTS 2,987,671   6/1961   Williams _____ 324—70

WALTER L. CARLSON, *Primary Examiner.*

M. J. LYNCH, *Assistant Examiner.*